United States Patent [19]
Brandt, Jr.

[11] Patent Number: 5,481,919
[45] Date of Patent: Jan. 9, 1996

[54] FORCE MULTIPLYING PRESSURE TRANSMITTER DIAPHRAGM AND METHOD EMPLOYING FLEXIBLE FORCE TRANSMITTING COLUMN

[76] Inventor: Robert O. Brandt, Jr., P.O. Box 5606 Hanover Center, Wilmington, N.C. 28403

[21] Appl. No.: 171,905

[22] Filed: Dec. 21, 1993

[51] Int. Cl.$^6$ ................... G01L 7/08; G01L 9/00
[52] U.S. Cl. ................... 73/723; 73/705; 73/717; 73/724; 73/728; 250/231.19
[58] Field of Search ................... 73/705, 715, 716, 73/717, 718, 723, 724, 728, 722; 250/231.19, 237 R

[56] References Cited

U.S. PATENT DOCUMENTS

| | | | |
|---|---|---|---|
| 3,100,999 | 8/1963 | Andresen, Jr. ................... | 73/716 |
| 4,049,935 | 9/1977 | Gruber ................... | 73/717 X |
| 4,604,633 | 8/1986 | Kimura et al. ................... | 250/231.19 X |
| 4,687,927 | 8/1987 | Iwamoto et al. ................... | 73/705 X |
| 4,928,529 | 5/1990 | Brandt, Jr. ................... | 73/726 |

*Primary Examiner*—Richard Chilcot
*Assistant Examiner*—Joseph L. Felber
*Attorney, Agent, or Firm*—Rosenthal & Putterman

[57] ABSTRACT

A pressure transmitter converts input pressures on the order of 0.000.15 inch of water column to proportional electrical output signals. A housing defines an open internal chamber and a substantially constant area shaped membrane spans the chamber and is secured about its perimeter thereto, dividing it into a convex side and a concave side. The convex side of the membrane forms an input side adapted to receive an input pressure. A beam is mounted for pivotal movement on the concave side of the membrane. One end of the beam supports a mechanical column which contacts the membrane and asserts a slight upward force on it. The opposite end of the beam mounts a reflector which is mounted directly over a photomicrosensor which outputs a voltage signal proportional to the movement of the reflector. A second photomicrosensor outputs a constant reference output voltage. A comparator receives both photomicrosensor outputs and outputs a voltage signal proportional to the difference therebetween. Thus, a pressure applied to the convex side of the membrane is converted to a proportional voltage output signal.

20 Claims, 10 Drawing Sheets

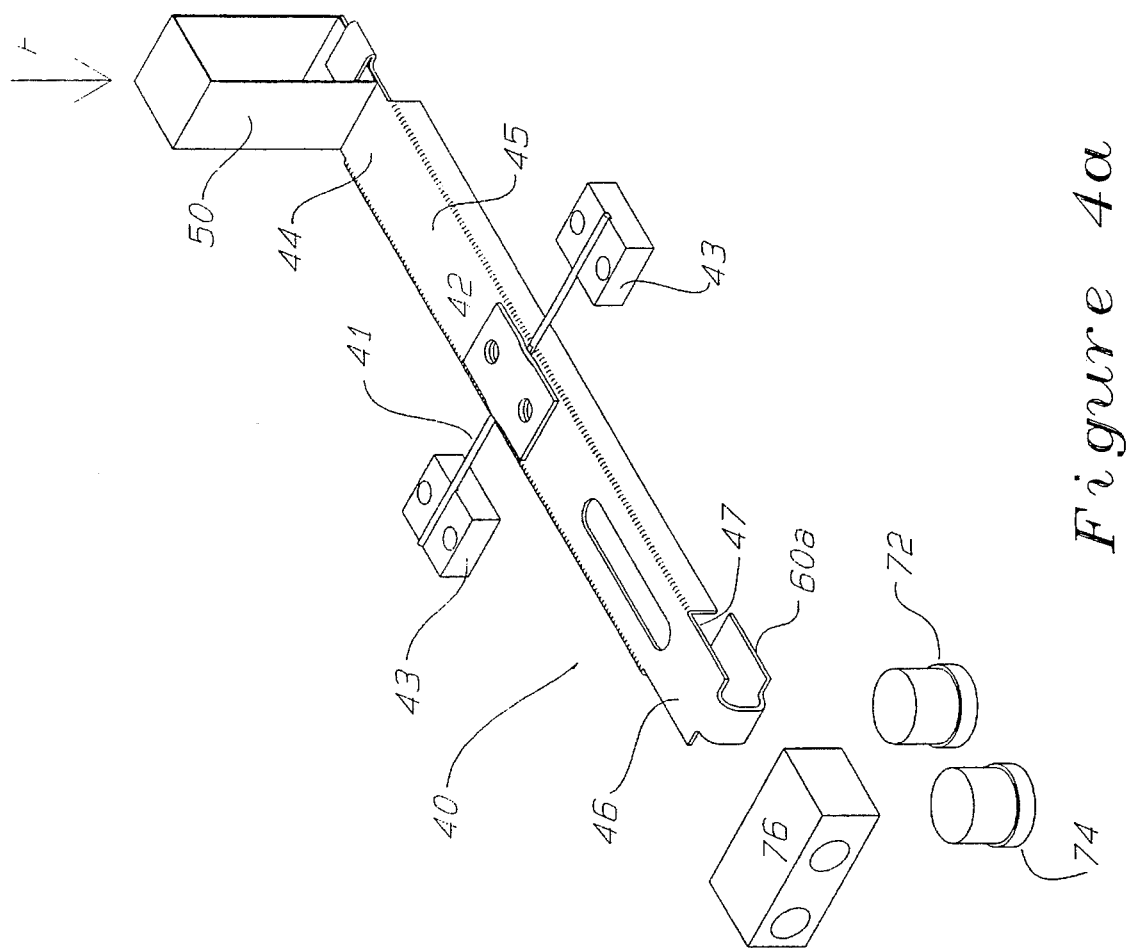

FORCE MULTIPLYING PRESSURE TRANSMITTER DIAPHRAGM AND METHOD EMPLOYING FLEXIBLE FORCE TRANSMITTING COLUMN

FIELD OF THE INVENTION

This invention relates generally to the field of pressure transmitters and more particularly to an apparatus that senses small changes in pressure and which produces an electrical output signal that is proportional to the sensed input pressure.

BACKGROUND OF THE INVENTION

Devices that sense differential changes in pressure are well known and are commercially available. However they are not without their drawbacks and disadvantages. First, they are typically relatively expensive and are not usually capable of responding with great sensitivity and accuracy, especially with respect to low pressures. Put simply, there are no pressure transmitters commercially available today that are relatively inexpensive and which have the capacity to measure full scale on the order of 0.0015 inch of water column. To even approach this range of sensitivity with any reasonable degree of accuracy results in the instrument being both large and expensive. This is because force multipliers and pressure transmitters of the past that are capable of producing an electrical output have been designed around diaphragms, fulcrums, and levers. Besides the obvious disadvantages associated with size, this design approach gives rise to other problems as well.

With conventional fulcrum and lever design, one has moving points, friction, and slop in the connecting linkage. All of this gives rise to hysteresis problems which contribute greatly to inaccuracies of the force multiplier.

Added to this is the basic problem that comes about due to the diaphragm itself being the measuring element. For very small movements of the diaphragm, there is obviously an output. Yet the very small movements of the diaphragm may be design related or internally generated, and not in any way be a result of a force of pressure change acting on the diaphragm of the instrument. The result of this is a most inaccurate instrument that cannot be relied upon and which has poor repeatability.

My prior invention, as disclosed in U.S. Pat. No. 4,928,529 entitled "Force Multiplying Membrane Instrument" discloses an apparatus that senses an input pressure and produces an electrical output signal that is proportional to the sensed input pressures and satisfactorily overcomes the above noted deficiencies. The apparatus employs a substantially constant area membrane that is preshaped to assume a concave-convex shape and is disposed within a housing structure where it extends across an open chamber within the housing structure and is secured about its periphery by the side walls of the housing structure. For positive multiplication, a force sensing system is disposed on the concave side of the membrane and actually extends into engagement with the membrane for supporting the same about the concave side. Because the membrane is preshaped, it extends inwardly at a selected angle relative to the horizontal plane of the periphery of the membrane secured within the housing. The force applied to the convex side of the membrane and transferred against the force sensing system is multiplied because of the angle of the membrane and the position of the force sensing system.

While my prior force multiplying instrument (described above) functioned well for pressures in the range 0.25 inch of water column, resolution faded below that level due to slight side loading which created slight curvilinear movement of the membrane which limited sensitivity and degraded accuracy.

In view of the foregoing it is therefore an object of the present invention to provide an improved pressure transmitter that senses pressures in the range of 0.00015 inch of water column.

It is a further object of the present invention to provide a pressure transmitter that produces an electrical output signal that is proportional to the applied input pressure.

Another object of the present invention is to provide a pressure transmitter that is relatively small and inexpensive to produce.

Yet another object of the present invention is to provide a pressure transmitter that remains accurate regardless of spatial orientation and that substantially eliminates side loading.

A still further object of the present invention is to provide a pressure transmitter wherein the electrical output signal does not drift over time.

Still another object of the present invention is to provide a pressure transmitter that overcomes the inherent disadvantages associated with like instruments.

SUMMARY OF THE INVENTION

The foregoing objects are accomplished by providing an apparatus for converting an applied input force in the form of an input pressure in to a proportional electrical output signal. The apparatus is characterized by its ability to sense input pressures as low as 0.00015 inches water column. A housing defining an open internal chamber is provided and a substantially constant area membrane spans the chamber. The membrane is secured about its perimeter to the housing such that it includes concave and convex opposite sides as disposed in the open chamber and further the convex side of the membrane forms an input side for receiving an input force. A force transmitting means is disposed on the concave side of the membrane and comprises a beam having a proximal end and a distal end. The beam is secured for pivotal movement about the central portion of its longitudinal axis to the housing. The proximal end of the beam mounts a column means for converting a displacement of the membrane into a corresponding displacement of the beam. The column means has one end connected to the beam and its opposite end is placed in contacting relation with the concave side of the membrane. A reflector means is connected to the distal end of the beam and a means for sensing the displacement of the distal end of the beam is operatively associated with the reflector means and is adapted to produce an output signal proportional to the distance therebetween. Thus, a force is applied to the convex side of the membrane and is converted into a proportional electrical output signal free of drift and hysteresis.

BRIEF DESCRIPTION OF THE DRAWINGS

Other objects and advantages of the present invention will become apparent and obvious from a study of the following description and the accompanying drawings which are merely illustrative of such invention.

FIG. 4a is a perspective, partially exploded view of an alternate embodiment of the force transmitter and photomicrosensor employed in the present invention.

FIG. 3a illustrates a photomicrosensor as employed in the present invention.

DETAILED DESCRIPTION OF THE ILLUSTRATED EMBODIMENTS

While the present invention will be described more fully hereinafter, it is to be understood at the outset that persons of skill in the art may modify the invention herein described while still achieving the favorable results of this invention. Accordingly, the description which proceeds is to be regarded as a broad teaching disclosure directed to persons of skill in the appropriate arts, and not as limiting upon the present invention.

Figure 1:
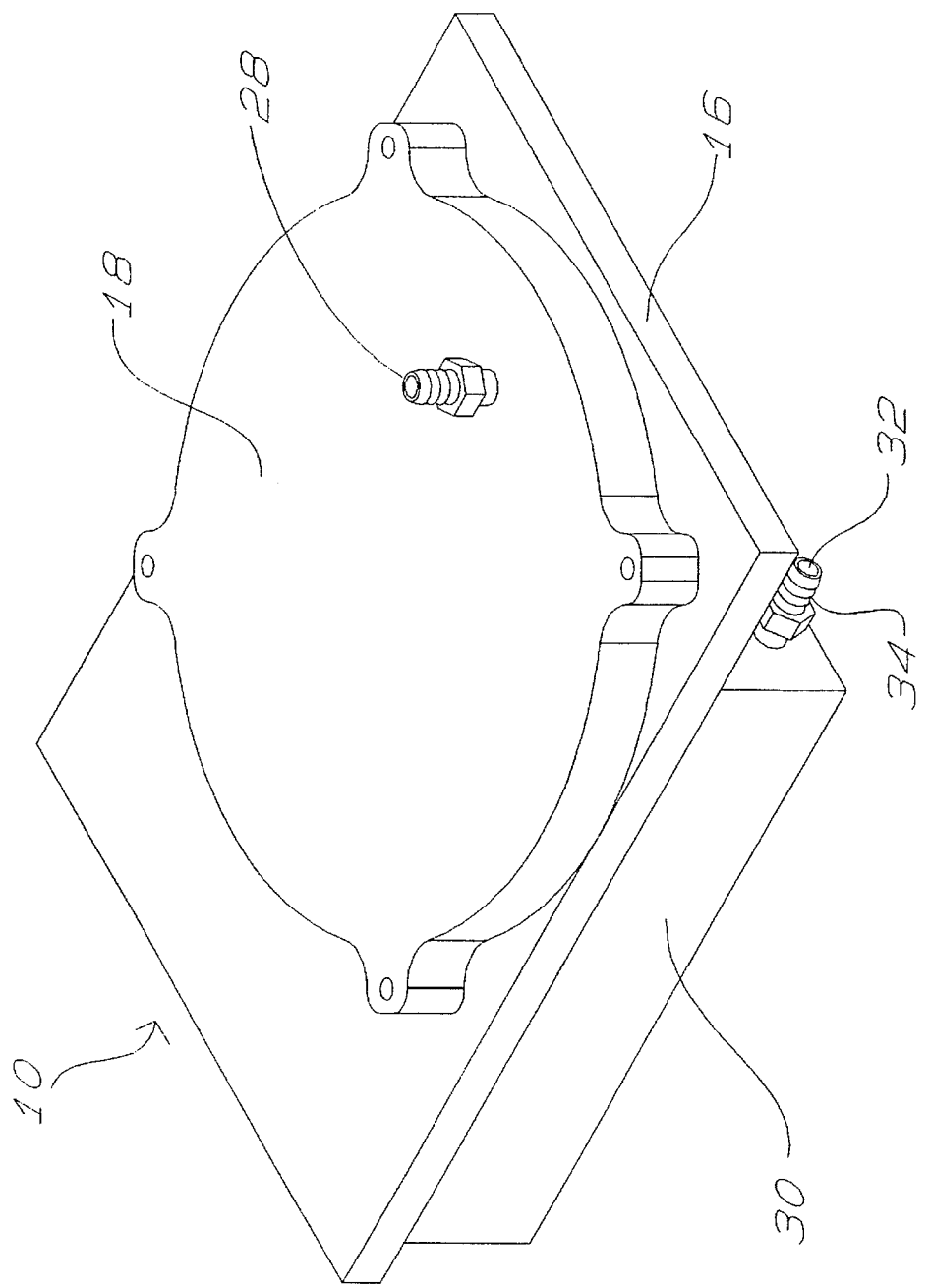
FIG. 1 is a perspective view of the pressure transmitter of the present invention.
Figure 2:
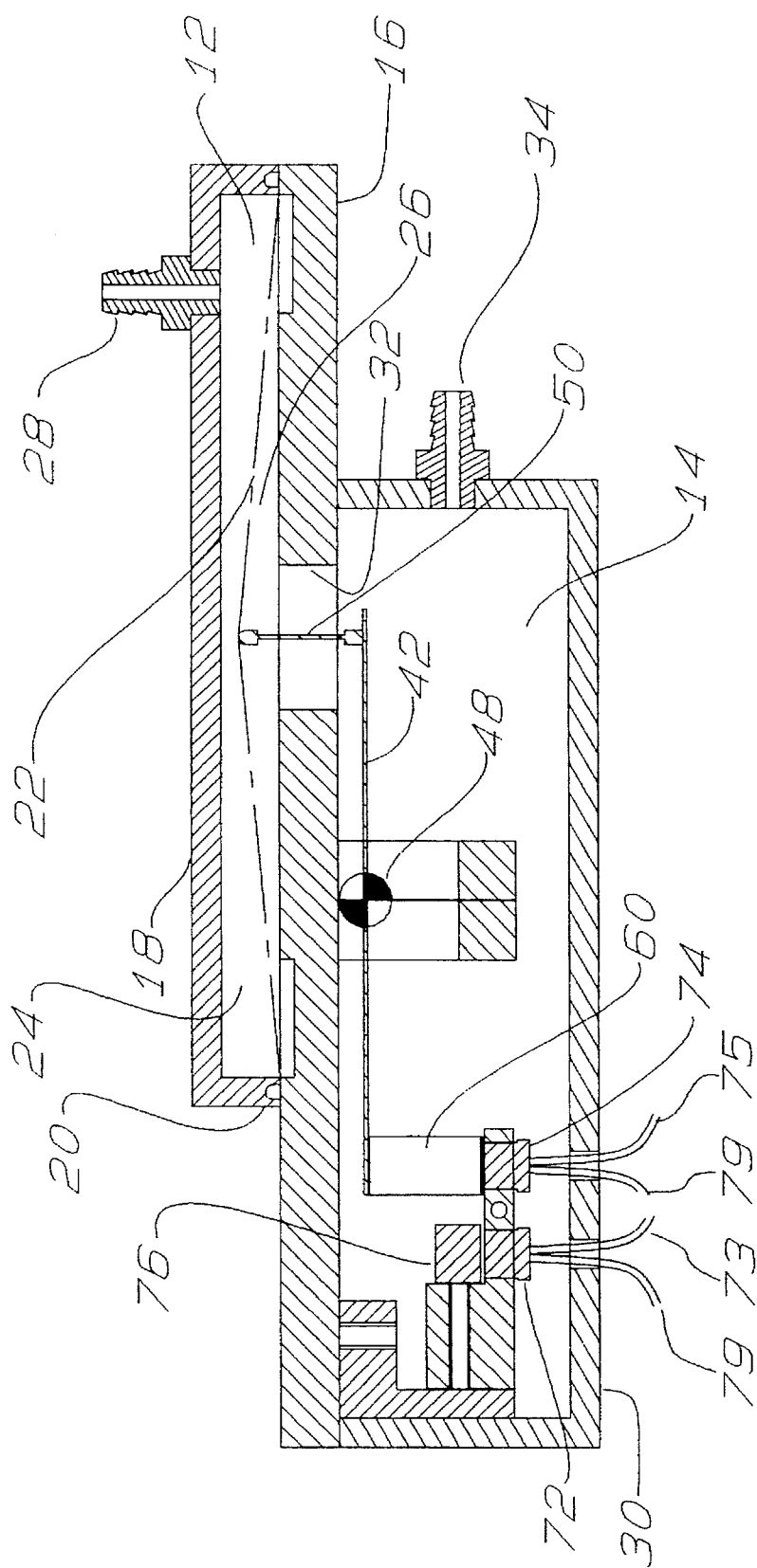
FIG. 2 is a transverse sectional view of the pressure transmitter of the present invention.

Referring more specifically to the drawings and particularly to FIGS. 1 and 2, the pressure transmitter according to the present invention, generally indicated at 10 includes a housing structure or housing that defines an open internal chamber which is divided into a positive pressure chamber 12 and a negative pressure chamber 14. The positive pressure chamber 12 and the negative pressure chamber 14 are secured to a common base 16.

Positive pressure chamber 12 is defined by base 16 and a top 18 which are secured together by suitable means such as screws (not shown) and a gasket 20. The positive pressure chamber 12 also includes a substantially constant area membrane 22 that spans the chamber 12 and is secured about its perimeter to the housing 10 such that it includes a convex side 24 and a concave side 26 as disposed in the open internal chamber 12. The gasket 20 assists in maintaining membrane 22 in position between base 16 and top 18. A positive pressure inlet 28 defines a channel and is in fluid communication with the convex side 24 of membrane 22.

Negative pressure chamber 14 is defined by base 16 and a bottom 30 forming a pressure seal and which is secured together by suitable means such as screws (not shown). A hole defining an opening 32 is formed in the portion of base 16 which lies directly beneath the central portion of membrane 22. Thus, the membrane 22 itself provides the separation between the positive pressure chamber 12 and the negative pressure chamber 14. A negative pressure inlet 34 defines a channel and is in fluid communication with the concave side 26 of membrane 22.

The membrane 22 is a genuine membrane inasmuch as it is substantially non-elastic and will not withstand a significant bending moment. Expressed in other ways, membrane 22 is constructed of a material having a very high stress to deformation ratio. An example of material constituting a membrane would be that produced by Dupont under the trade name Mylar.

Force transmitting means or force transmitter generally indicated at 40 is disposed on the concave side 26 of membrane 22 and comprises a beam 42, a reflector means 60, and a means for sensing the displacement of the beam 70.

The beam 42 has a proximal end 44 and a distal end 46, an upper surface 45, and a lower surface 47, and is secured for pivotal movement about the central portion of its longitudinal axis at pivot point 48 to mounting blocks 49 which are positioned in and which span negative pressure chamber 14. The proximal end 44 of beam 42 mounts a column means or mechanical column 50 on its upper surface 45 for converting a displacement of the membrane 22 into a corresponding displacement of the beam at 46.

Figure 4:
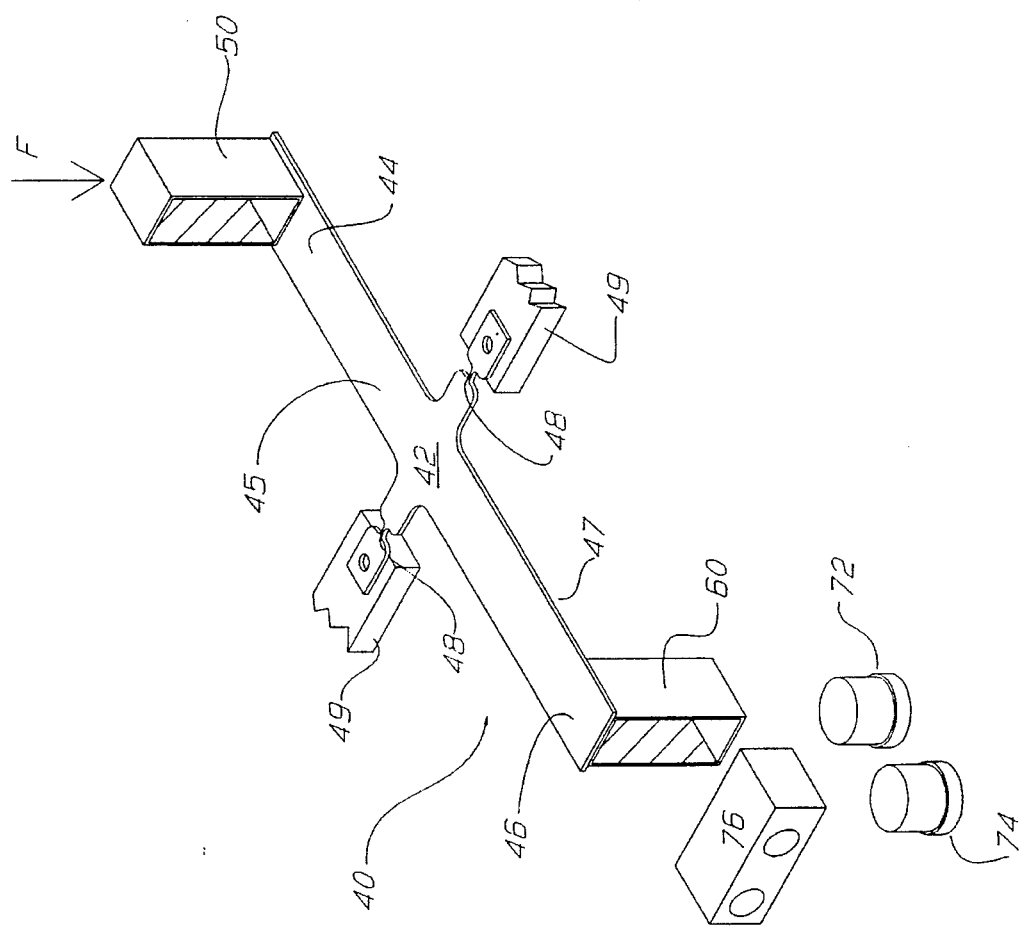
FIG. 4 is a perspective, partially exploded view of the force transmitter and photomicrosensor employed in the present invention.
Figure 5:
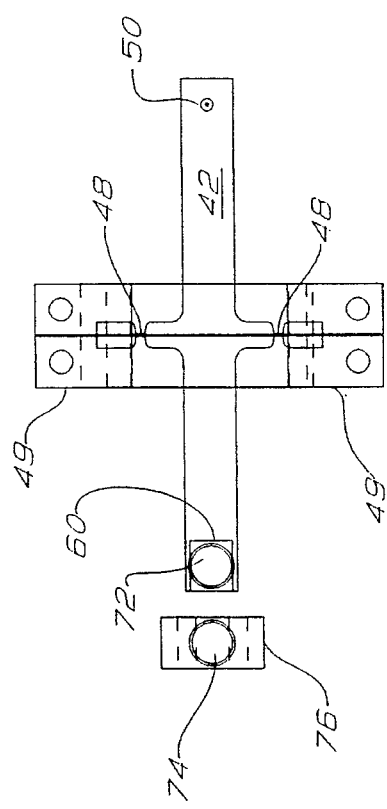
FIG. 5 is a plan view of the force transmitter and photomicrosensor employed in the present invention.
Figure 6:
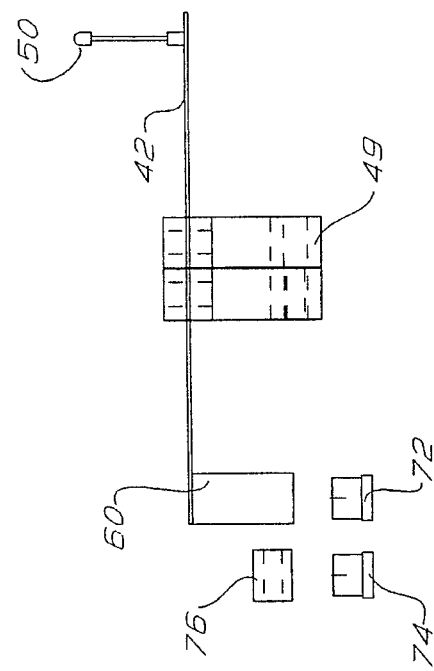
FIG. 6 is a side view of the force transmitter and photomicrosensor employed in the present invention.

In the alternate embodiment as illustrated in FIG. 4a, the beam is mounted to a torque rod 41 each end of which is mounted to a corresponding pillow block 43. The foregoing arrangement allows the span of the transmitter to be adjustable. For example, the shorter the torque rod is in length, the more difficult it will be to obtain movement of beam in response to an applied force. Conversely, the longer the torque rod, the easier it will be to move the beam upon application of a force thereto. The foregoing is a direct result of the fact that the force required to move the beam is directly proportional to the length of the torque rod.

With respect to the column 50, a force applied by the membrane to the column results in transmission of the force onto the torque rod and displacement thereof (ie, a force on the torque rod is converted into a displacement). One end of the column is connected to the beam 42 and the opposite end is in contacting relation with concave side 26 of the membrane 22. The term column means as employed herein is intended to be any long, slender element having a length to radius ratio of between about 30 and about 80 and as employed in the present invention is the ratio is approximately 60. The reader will appreciate that in order to accurately measure pressures on the order of 0.00015 inch of water column, that the type of transducer is used to transfer the forces must similarly be extremely sensitive. In view of the foregoing, while some of the figures illustrate a conventional appearing "column", its thickness is 2 mils, and the reader will appreciate the difficulty in attaching such a column to the beam 42. Therefore, a Mylar loop having a thickness of 2 mils is employed and it operates as a column, thus minimizing the problems of side loading, which limits sensitivity and degrades accuracy, problems which are inherent in other low pressure sensing transducers. The loop or column 50 is attached to the beam by glue, fusion, or other suitable means well known to those skilled in the art. The column 50 exerts a slight upward force on membrane 22 and a pressure applied to the positive pressure inlet 28 is therefore multiplied between about 1.0 to about 2.0 times by the membrane. In the prototype that was constructed, the input pressure was multiplied about 1.1 to about 1.2 times. It will be appreciated that the use of a flexible loop also provides overpressure protection as the loop itself deforms when such a condition occurs and returns to its original shape when the overpressure condition is eliminated.

A reflector means or reflector 60 is connected to the lower surface 47 of beam 42 proximate its distal end. The reflector 60 in the illustrated embodiment is a piece of reflective foil mounted in a loop, again by suitable means in the manner in which the Mylar loop 50 is mounted to the beam 42. A 1 mil foil was chosen as it is substantially equal to the weight of the column 50 so that the beam 42 remains statically and dynamically balanced. In the alternate embodiment of FIG. 4a, the end of the beam can be bent as shown at 60a so that the weight of the overhanging section is equal to the weight of the MYLAR loop. Similarly, it can be coated with a reflective coating, if necessary, or the beam can be constructed of a sufficiently reflective material. This feature allows the pressure transmitter 10 to produce an accurate, substantially noise free output regardless of transmitter orientation as the effects of gravity are negligible, the pulls of the respective reflector 60 and column 50 being equal and opposite.

A means for sensing 70 the displacement of distal end of the beam 42 is operatively associated with the reflector 60 and is adapted to produce an output signal proportional to the distance therebetween. The means for sensing 70 includes a first photomicrosensor means or first photomicrosensor 74 for converting movement of the distal end of the beam into a proportional electrical output signal. A second photomicrosensor means or photomicrosensor 72 for producing a constant reference electrical output signal is positioned beneath a reference block 76.

Figure 7:
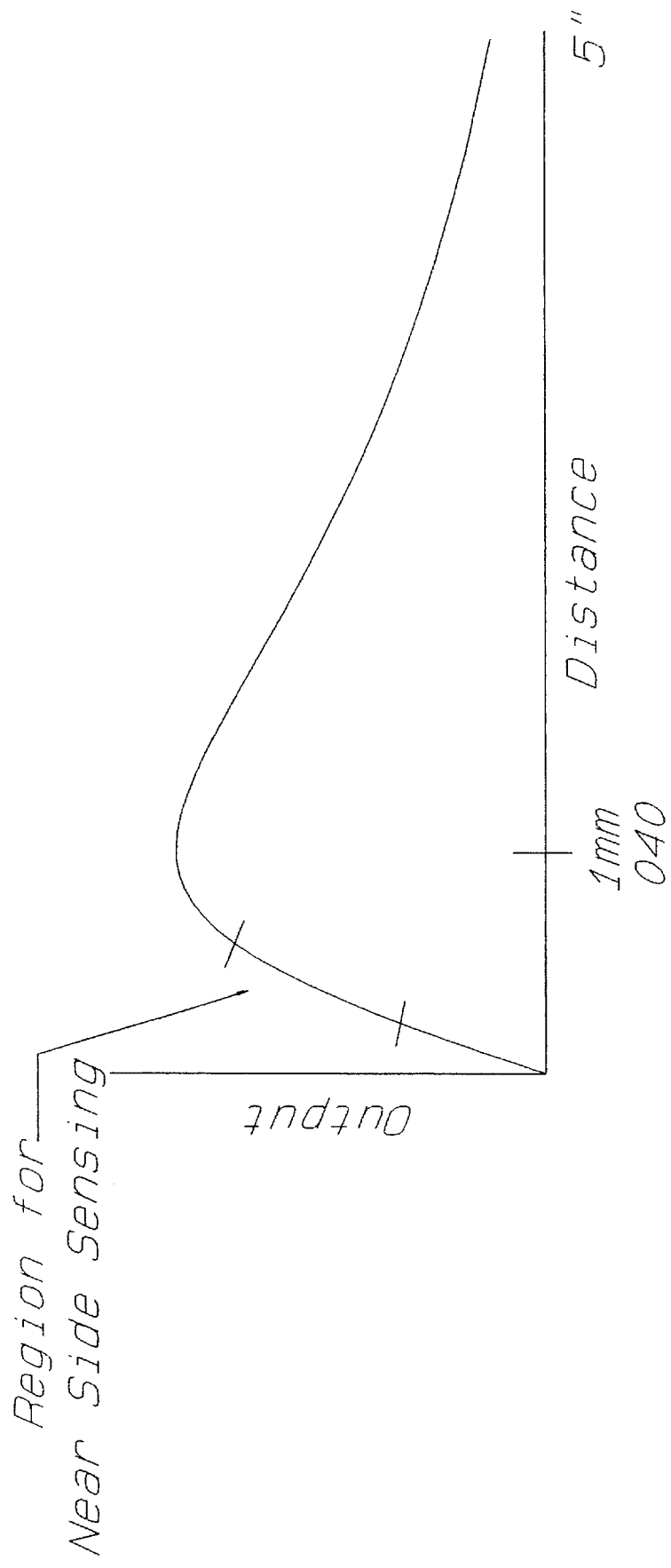
FIG. 7 illustrates the operational characteristics of a photomicrosensor as employed in the present invention.

A photomicrosensor such as is employed in accordance with the present invention is illustrated in FIG. 7a. A photomicrosensor comprises an optical transmitter which normally takes the form of a light source such as a light emitting diode (LED) to which power is supplied via leads 79; and an adjacent optical receiver (phototransistor or photodiode). Normally, the transmitter and receiver are positioned mounted in a plane adjacent one another on a common mounting block and the receiver is adapted to produce an output voltage that is proportional to the intensity of the light that is received by the receiver from the transmitter. With respect to the present invention, the near side region of the operational curve is selected due to its high sensitivity and linearity. It will be noted that devices, such as variable reluctance transducers, variable capacitance transducers, and other similar devices can be employed to measure the displacement of the foil loop 60. The foregoing devices are well known to those skilled in the art and a detailed discussion of the design criteria is not deemed necessary.

Figure 3:
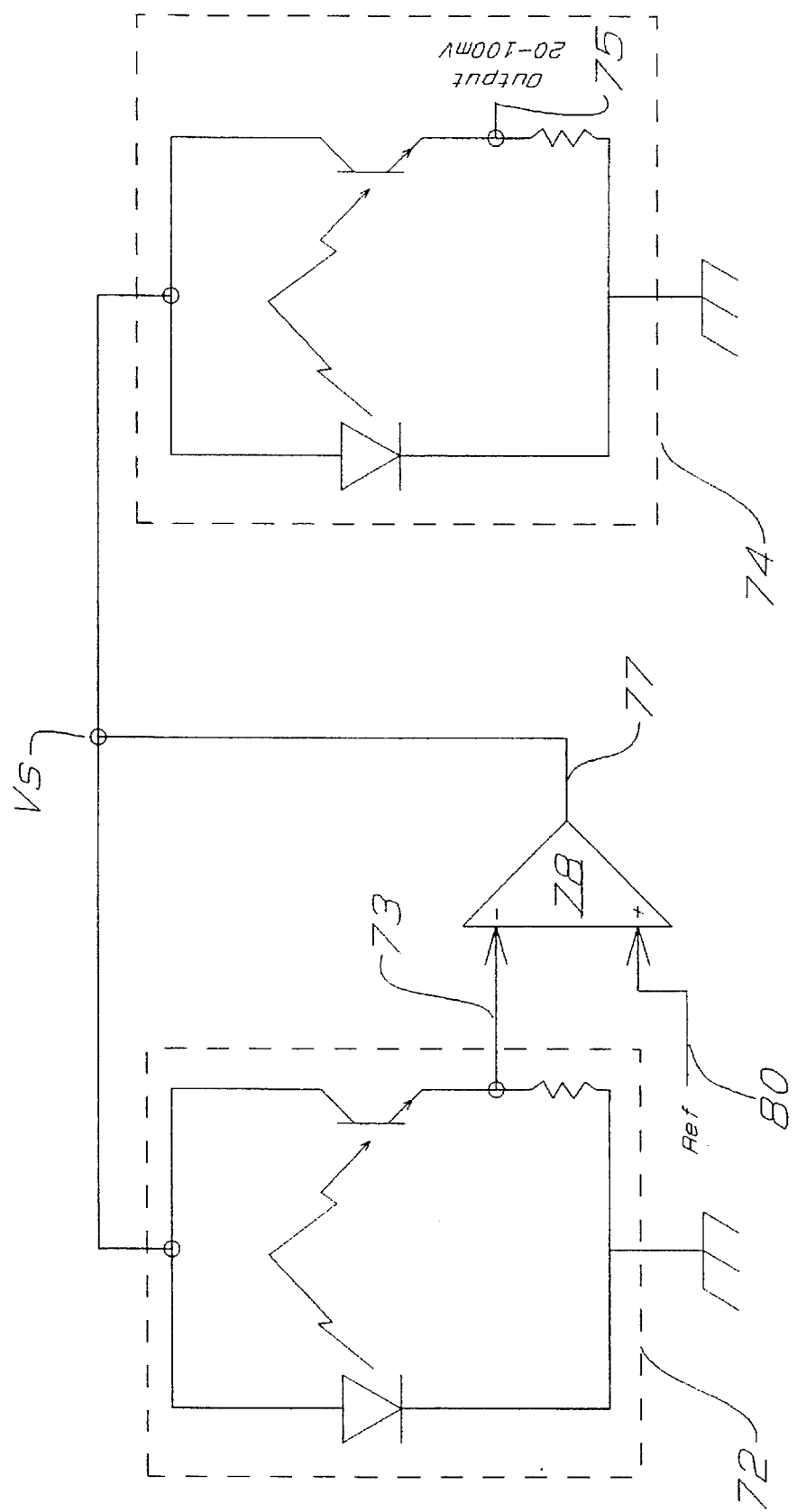
FIG. 3 is a schematic diagram of the circuitry of the present invention used to stabilize the output signal.

As briefly mentioned, the output signal of the pressure transmitter according to the present invention remains constant over time despite physical changes that occur in the photomicrosensor silicon. This is accomplished by the circuit as illustrated in FIG. 3. The first photomicrosensor 74 and the second photomicrosensor 72 are connected to a common voltage source $V_s$. The output signal on line 73 from the phototransistor of photomicrosensor 72 becomes the negative input signal to the controller or operational amplifier 78. Similarly, a reference voltage $V_{ref}$ is the positive input on line 80 into operational amplifier 78. Thus, if the reference voltage signal decays over time, the controller 78 then modulates the current supplied to the LED portion of the first and second photomicrosensors 72, 74 respectively which raises the voltage on line 77, resulting in a constant output on line 73. Diodes can also be put in series with each other to raise the voltage on line 77.

The second photomicrosensor output signal on line 75 produces an output signal in the form of an output voltage that is proportional to the distance between the diode and the reflective surface under deflection. Further details of the comparator and of the photomicrosensors are not dealt with herein in greater detail because such devices are commercially available and will be known to those skilled in the art.

Figure 10:
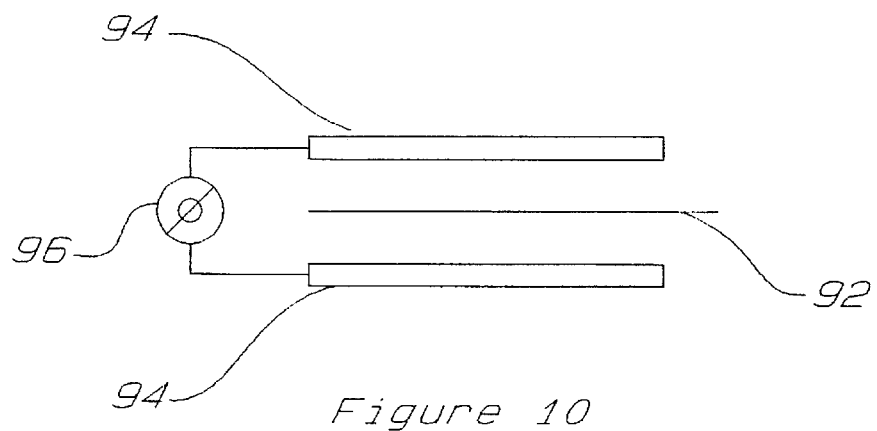
FIG. 10 is a schematic diagram of a variable capacitor transducer which may be substituted for the photomicrosensor of FIG. 3.
Figure 11:
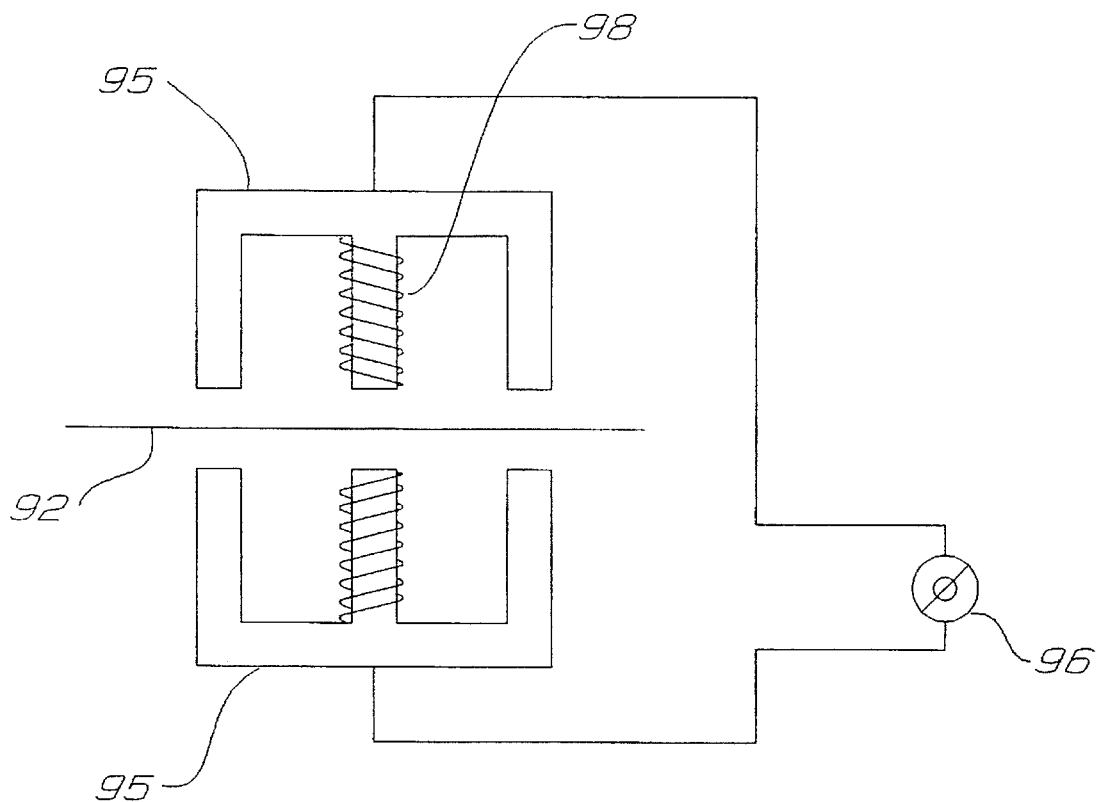
FIG. 11 is a schematic diagram of a variable reluctance transducer which may be substituted for the photomicrosensor of FIG. 3.

It will be noted that other sensing devices may be employed to sense displacement of the beam. For example a variable capacitance transducer as shown in FIG. 10 may employed. The variable capacitance transducer comprises top and bottom capacitive plates 94 measuring plate 92 mounted on the beam and between said plates. Similarly, the variable inductance transducer as illustrated in FIG. 11 may also be employed. The variable inductance transducer comprises a measuring plate mounted to the beam and between a pair of inductors 95 having an energizable coil associated therewith. In the operation of either of the foregoing devices, displacement of the beam causes a proportional change in the electrical output signal from the transducer. This signal is then input to a phase shift detector circuit 96 which amplifies that output signal for further processing. Phase shift detector circuits are available as off the shelf integrated circuits, well known to those skilled in the art and a detailed discussion of the implementation of is not deemed necessary.

Figure 8:
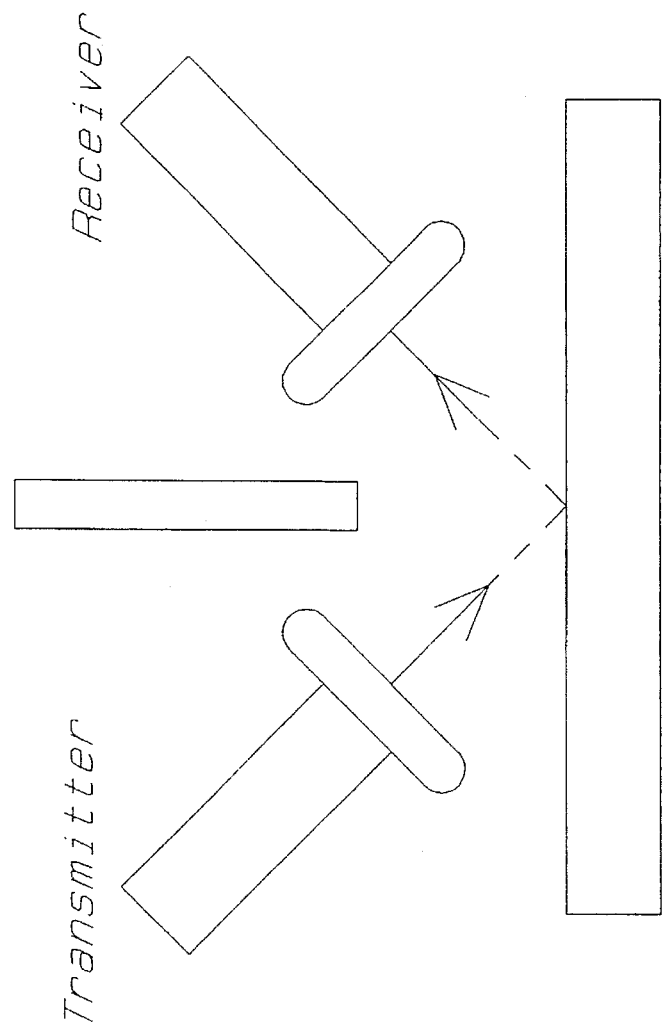
FIG. 8 is a perspective view of an alternate embodiment of the beam as employed in the present invention.
Figure 9:
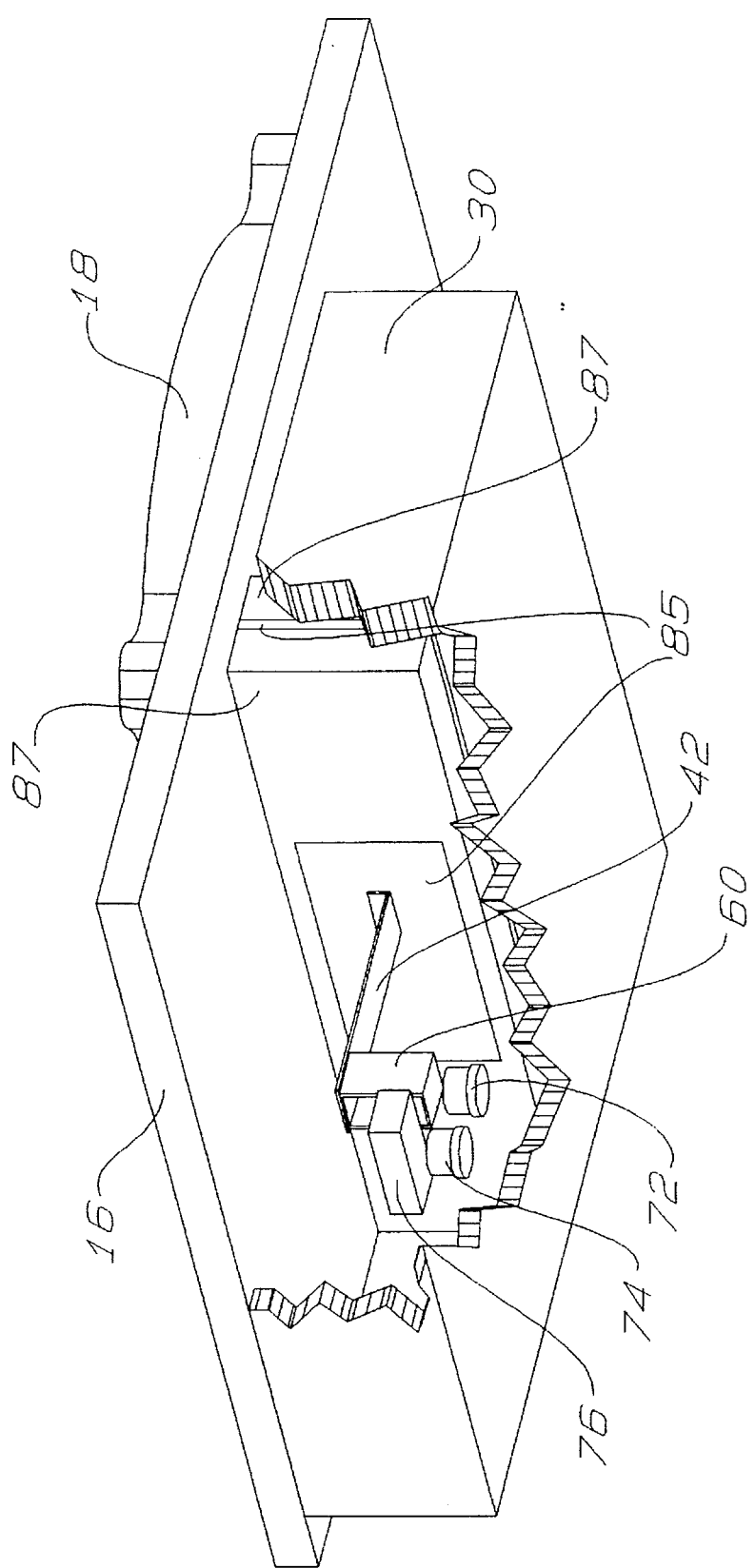
FIG. 9 is a perspective view partially broken away of the alternate embodiment of the beam and illustrates it spanning the negative pressure chamber.

An alternate embodiment of the invention is illustrated in FIGS. 8 and 9. In this embodiment, the beam 42 is divided into two sections, each of which is attached to a sheet flexure 85 in the form of an aluminum sheet 0.002 inch or less in thickness. The flexure 85 spans the negative pressure chamber and is held in place by perimeter seals 87 and which are positioned on each side of the flexure 85 along with standard rubber seals 87. In this arrangement the sheet flexure also acts as the torque rod and prevents degradation and/or damage to the electronics and measurement sections of the instrument when the pressures of toxic gasses are being measured.

In operation, the convex side 24 of membrane 22 is loaded with an input force, for example, an input pressure. This results in a slight deformation of membrane 22 which, in turn causes a flexure of column 50. The flexure of column 50 causes a corresponding movement of beam 42 about its pivot point 48 causing the reflective loop 60 to move with respect to the first photomicrosensor 72, thus causing a change in the output voltage on line 75 from the first photodiode. The output voltage on line 75 is then output to a comparator (not shown) and the resulting output signal is a voltage output proportional to the pressure applied to the convex side of the membrane 22. The output signal on line 75 may then be amplified if required and employed as a part of a process controller.

The foregoing embodiments and examples are to be considered illustrative, rather than restrictive of the invention, and those modifications which come within the meaning and range of equivalence of the claims are to be included therein.

That which is claimed is:

1. An apparatus for converting an applied force in the form of an input pressure into a corresponding proportional electrical output signal, characterized by its ability to sense input pressures as low as 0.00015 inch of water column and comprising:

a housing defining an open internal chamber;

a substantially constant area membrane spanning said chamber and secured about its perimeter to the housing such that it includes concave and convex opposite sides as disposed in the open chamber and wherein the convex side of the membrane forms an input side for receiving an input force;

force transmitting means disposed on the concave side of said membrane comprising:

a beam having a proximal end and a distal end, said beam being secured for pivotal movement about the central portion of its longitudinal axis to the housing, the proximal end of said beam mounting a flexible column means for converting a displacement of said membrane into a corresponding displacement of said beam, said column means having one end connected to said beam and the opposite end being in contacting relation with said membrane, and wherein said column means transmits substantially all of the forces exerted thereon by the membrane to said beam, reflector means connected to the distal end of said beam, means for sensing the displacement of the distal end of said beam operatively associated with said reflector means and adapted to produce an output signal proportional to the distance therebetween and, whereby a force applied to the convex side of said membrane is converted into a proportional electrical output signal free of inaccuracies due to side loading.

2. An apparatus according to claim 1 wherein the means for sensing the displacement of the distal end of said beam comprises:

(a) a first photomicrosensor means for converting movement of the distal end of said beam into a proportional electrical output signal;

(b) a second photomicrosensor means for producing a constant reference electrical output signal;

(c) a comparator means for comparing the constant reference electrical output signal with a preselected reference signal and for maintaining said constant reference electrical output signal at the reference signal level, and wherein the output signal of the means modulates a preselected signal applied to the respective first and second photomicrosensor means to maintain the constant reference output signal of the second photomicrosensor means constant, whereby the output signals of the first photomicrosensor and the second photomicrosensor are insensitive to drift caused by fluctuations in temperature or circuit aging.

3. An apparatus according to claim 1 wherein said beam includes a first surface and a second surface, said column means being mounted to said first surface and said reflector means being mounted to said second surface.

4. An apparatus according to claim 3 wherein said column means and said reflector means are of substantially equal weight.

5. An apparatus according to claim 1 wherein said column means comprises a mechanical column wherein its length is between about 30 and about 80 times its radius.

6. An apparatus according to claim 1 wherein said column means comprises a loop and wherein said reflector means comprises a reflective foil loop.

7. An apparatus according to claim 1 wherein said column means is in contacting relation with the central portion of said membrane.

8. An apparatus according to claim 1 wherein said column means exerts a slight upward pressure on said membrane.

9. An apparatus according to claim 1 wherein the convex-concave shape of said membrane gives rise to the multiplication of forces applied to the convex side of the membrane due to the orientation of the membrane with respect to the column means supporting the central portion thereof.

10. An apparatus according to claim 1 wherein the membrane multiplies the force between 1.00 and about 2.00 times.

11. An apparatus according to claim 1 wherein said means for sensing includes a variable reluctance transducer including a loop comprised of a reluctance sensitive material.

12. An apparatus according to claim 1 wherein said means for sensing includes a variable capacitance transducer including a loop comprised of a capacitance sensitive material.

13. An apparatus according to claim 1 wherein said beam is divided into a first section and a second section of substantially equal lengths, said first section mounting said column means proximate one end and its opposite end being connected to the first side of a sheet flexure means, the second section of said beam mounting said reflector means proximate one end and its opposite end being connected to the opposing side of said sheet flexure means, the pivot point of said beam being the sheet flexure means and wherein said sheet flexure means spans the concave side of said chamber dividing it into discrete sealed chambers, whereby the means for sensing is isolated from the concave side of the membrane.

14. An apparatus for converting an applied force in the form of an input pressure into a corresponding proportional electrical output signal, characterized by its ability to sense input pressures as low as 0.00015 inch of water column and comprising:

a housing defining an open internal chamber, a substantially constant area membrane spanning said chamber and secured about its perimeter by the housing such that it includes concave and convex opposite sides as disposed in the open chamber, and wherein the convex side of said membrane forms an input side for receiving an input force;

a force transmitting means disposed on the concave side of the membrane comprising:

a beam having an upper surface and a lower surface, a proximal end and a distal end, said beam being secured for pivotal movement about the central portion of its longitudinal axis to the housing, the proximal end of said beam mounting a flexible mechanical column for converting the displacement of said membrane into a corresponding displacement of said beam, said mechanical column having one end mounted on the upper surface of said beam and the opposite end in contacting relation with said membrane, and wherein said column means transmits substantially all of the forces exerted thereon by the membrane to said beam, a reflector mounted on the lower surface of said beam proximate the distal end of said beam, a first photomicrosensor operatively associated with said reflector adapted to produce an electrical output signal proportional to the movement of said reflector, a second photomicrosensor operatively associated with a reference block adapted to produce a constant reference electrical output signal; and a comparator adapted to compare the constant reference electrical output signal with a preselected reference signal and for maintaining said constant reference output signal at the preselected reference signal level, and wherein the output signal of the comparator modulates a signal applied to the respective first and second photomicrosensors to maintain the constant reference output signal of the second photomicrosensor constant, whereby a force applied to the convex side of said membrane is converted into a proportional electrical output signal free of drift and hysteresis.

15. An apparatus according to claim 14 wherein said beam is divided into a first section and a second section of substantially equal lengths, said first section mounting said column proximate one end and its opposite end being connected to the first side of a sheet flexure means, the second section of said beam mounting said reflector proximate one end and its opposite end being connected to the opposing side of said sheet flexure means, the pivot point of said beam being the sheet flexure means and wherein said sheet flexure means spans the concave side of said chamber dividing it into discrete sealed chambers.

16. A method of sensing input forces on the order of 0.00015 inch of water column and comprising the steps of:

securing a substantially constant area membrane around a perimeter, supporting the membrane such that the membrane assumes a shape having a concave side and a convex side and that extends at an angle relative to a horizontal reference plane that lies in the plane of the membrane's perimeter as secured, directing an input force against the convex side of the membrane and multiplying the force less than about 2.0 times due to the angle of the membrane with respect to the horizontal reference plane, transferring the force generated by the membrane to a force transducer in the form of a beam having a proximal end and a distal end, the proximal end supporting one end of a flexible column and the other end of the column being in contacting relation with the central portion of the concave side of the membrane, and wherein the column transmits substantially all of the forces exerted thereon by the membrane to the beam, the distal end of the beam supporting a reflector, and wherein the reflector is in operative association with a microsensor that outputs an electrical signal proportional to the distance between the microsensor and the reflector, and a second microsensor in operative association with a reference block that outputs a reference signal, comparing the reference signal and the proportional signal and outputting a difference signal that is proportional to the force applied to the membrane.

17. The method according to claim 16 wherein the microsensors are photomicrosensors.

18. The method according to claim 16 wherein the microsensors are variable reluctance transducers.

19. The method according to claim 16 wherein the microsensors are variable capacitance transducers.

20. The method according to claim 16 wherein the beam is divided into a first section and a second section of substantially equal lengths about the pivot point, the respective ends of the beam being connected to the opposite sides of a sheet flexure, the sheet flexure spanning the portion of the housing below the concave side of the membrane and dividing it into discrete sealed chambers.

* * * * *